(12) United States Patent
Chanteux et al.

(10) Patent No.: US 10,118,654 B2
(45) Date of Patent: Nov. 6, 2018

(54) AERODYNAMIC DEVICE TO BE FASTENED UNDER A VEHICLE, AND VEHICLE EQUIPPED WITH SUCH AN AERODYNAMIC DEVICE

(71) Applicant: VOLVO TRUCK CORPORATION, Göteborg (SE)

(72) Inventors: Maxime Chanteux, Lyons (FR); Philippe De Matteis, Irigny (FR); Damien Chacaton, Lyons (FR); Laurent Kint, Saint Sorlin de Morestel (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/516,900

(22) PCT Filed: Oct. 8, 2014

(86) PCT No.: PCT/EP2014/002731
§ 371 (c)(1),
(2) Date: Apr. 5, 2017

(87) PCT Pub. No.: WO2016/055079
PCT Pub. Date: Apr. 14, 2016

(65) Prior Publication Data
US 2017/0259858 A1    Sep. 14, 2017

(51) Int. Cl.
*B62D 35/00* (2006.01)
(52) U.S. Cl.
CPC ......... *B62D 35/005* (2013.01); *B62D 35/001* (2013.01); *H05K 999/99* (2013.01)
(58) Field of Classification Search
CPC .. B62D 35/001; B62D 35/002; B62D 35/005; B62D 37/02

(Continued)

(56) References Cited

U.S. PATENT DOCUMENTS

| | | | |
|---|---|---|---|
| 8,668,245 B2 * | 3/2014 | Kakiuchi | B62D 35/02 180/69.1 |
| 2012/0013145 A1 * | 1/2012 | Jungert | B62D 35/005 296/180.1 |
| 2014/0070564 A1 | 3/2014 | Bernard | |

FOREIGN PATENT DOCUMENTS

| | | |
|---|---|---|
| GB | 2512477 A | 10/2014 |
| WO | 2014023630 A1 | 2/2014 |

OTHER PUBLICATIONS

International Search Report (dated Jun. 2, 2015) for corresponding International App. PCT/EP2014/002731.

* cited by examiner

*Primary Examiner* — Dennis H Pedder
(74) *Attorney, Agent, or Firm* — WRB-IP LLP (57) ABSTRACT

An aerodynamic device suitable to be fastened under and to extend downwards from a vehicle, near the vehicle front face includes one central spoiler having a front wall and two side walls extending rearwards from the front wall side ends, and two lateral spoilers, each lateral spoiler having a front wall as well as an outer side wall and an inner side wall each extending rearwards from a front wall side end. In the operative position of the aerodynamic device, the inner side wall of each lateral spoiler substantially faces a corresponding side wall of the central spoiler and forms a channel having a substantially longitudinal axis and having a width along a transverse direction which decreases from its front end to its rear end, so that the channel is capable of canalizing and accelerating air flowing under the vehicle substantially longitudinally from the channel front end towards its rear end.

17 Claims, 4 Drawing Sheets

(58) Field of Classification Search
USPC .................... 296/180.1–180.5, 208; 180/903
See application file for complete search history.

AERODYNAMIC DEVICE TO BE FASTENED UNDER A VEHICLE, AND VEHICLE EQUIPPED WITH SUCH AN AERODYNAMIC DEVICE

BACKGROUND AND SUMMARY

The invention relates to an aerodynamic device suitable to be fastened under and to extend downwards from a vehicle, especially a vehicle having a substantially vertical front face such as a truck for example. The invention also relates to a vehicle comprising an aerodynamic device.

For many years, attempts have been made to improve vehicle efficiency. One factor in an efficient design is the aerodynamic characteristics of a vehicle. The air drag of a vehicle and especially of an industrial vehicle such as a truck is one of the factors that has a direct impact on fuel consumption. Therefore, in a general trend towards rare and expensive energy—whether fossil or not—, aerodynamics is one of the key issue in an efficient vehicle.

One problem with the current industrial vehicles is the drag generated by air flowing under the vehicle. Indeed, when the vehicle is in motion in the forward direction, an air flow passes under the vehicle, roughly from front to rear, with a possible tilt with respect to the longitudinal direction in case of lateral wind. This air flow tends to cause turbulence around the vehicle wheels Therefore, such an air path is not favourable from an aerodynamics perspective insofar as it increases the vehicle drag coefficient and, consequently, generates high fuel consumption.

It therefore appears that there is room for improvement in vehicles aerodynamics, especially under the vehicle.

It is desirable to provide an aerodynamic device which improves aerodynamics under the vehicle.

According to a first aspect of the invention, by mounting under a vehicle an aerodynamic device having dimensions adapted to the vehicle dimensions, and by positioning it appropriately, it is possible to deflect and canalize air flowing rearwards under the vehicle away from the vehicle wheels. Therefore, the drag under the vehicle is decreased, especially the drag due to the wheels.

Indeed, on the one hand, part of the incoming air is made to enter the channels provided between the central spoiler and the lateral spoilers. Because the channels are convergent rearwards and due to the positioning of their axis, this air flow is accelerated and canalized rearwards, substantially longitudinally. As a result, at each channel rear end, there is obtained a narrower and fairly strong air flow which can efficiently be directed in the appropriate direction. The overall result of this arrangement is that the air flow passing under the trucks is deviated substantially longitudinally, whatever the direction of the incoming air flow, which allows the wheels not to be on the air path. After the air flow has come oat of the channels, its direction cannot be controlled anymore. However, owing to the acceleration provided by the channels, the air flow tends to follow the direction it has been given on a longer way rearwards. This greatly limits the amount of air flowing towards the wheels.

On the other hand, the aerodynamic device can furthermore be designed so that another part of the incoming air flows along the outer side walls of the lateral spoilers or even is diverted outwards, so as to limit the drag to the vehicle wheels.

The invention therefore makes it possible to greatly improve the air path below the level of the vehicle floor—i.e. both sander the vehicle and around the vehicle—and consequently to lower the vehicle aerodynamic drag and decrease the fuel consumption.

Allowing air to flow under the vehicle, along an improved path, also ensures stability of the vehicle as compared to front aerodynamic devices preventing air from flowing under the vehicle.

By "a channel having a substantially longitudinal axis" is meant that the channel axis and the longitudinal direction can form a slight angle, typically lower than 10°, and preferably lower than 5°. The channel can be oriented slightly outwards, provided it makes it possible for the canalized airflow not to be directed towards the vehicle wheels. The "channel axis" is defined as the bisecting line of a sector formed by the side walls of two contiguous spoilers, e.g the sector formed by the inner side wall of the right lateral spoiler and the right side wall of the central spoiler, or by the inner side wall of the left spoiler and the left side wall of the central spoiler.

The inner side wall of a lateral spoiler and the corresponding side wall of the central spoiler are not necessarily symmetrical with respect to a longitudinal axis. As regards the lateral spoilers, they are preferably substantially identical, this not being limitative.

In the operative position of the aerodynamic device, the upper edges of the front walls of the central spoiler and lateral spoilers can be arranged substantially in a same transverse and vertical plane.

According to an embodiment, the channel side walls form together an angle which points rearwards and which ranges from 5° to 50°, preferably from 10° to 40°, for example around 30°. This makes it possible to direct airflow in the proper direction under the truck.

According to an embodiment, the channel width, at the channel front end, ranges from 80% to 170% of the lateral spoiler greatest width, preferably from 100% to 150%.

According to an embodiment, the spoilers lower parts are capable of being elastically delbrmed by a rigid element such as an obstacle or a pavement. However, the spoilers are rigid enough not to be deformed by the incoming air flow, in normal conditions. This feature prevents the spoilers from being damaged in case they hit such a rigid element. For example, the spoilers lower parts—or the whole spoilers—can be made of a soft plastic material. In case of a shock, the damaged spoiler(s) can be replaced.

Besides, the thickness of at least one spoiler can decrease from its upper edge towards its lower edge. This feature can be used to make the spoilers lower parts elastically deformable as previously explained.

According to an embodiment, each side wall and the front wall of the central spoiler form an angle ranging from 80° to 150°, preferably from 90° to 120°, for example around 110°. More generally, said angle ranges from a minimum to a maximum value, with the minimum value being 80°, preferably 90°, more preferably 95°, and the maximum value being 150°, preferably 140°, preferably 120°, and more preferably 110°.

As regards the central spoiler length—along the longitudinal direction—from its front end towards its rear end, it can range from 50 to 200 mm, preferably from 50 to 160 mm. This feature ensures that air flow is properly directed and that the aerodynamic device does not degrade aerodynamics.

Below the minimum value, efficiency is not optimum. Above the maximum value, the central spoiler drag is too high; moreover, in case of lateral wind, the surface area hit by incoming air is too high, which decreases the aerodynamic device efficiency.

Besides, the central spoiler height—along the vertical direction—can range from 30 to 150 mm. Below 30 mm, aerodynamics benefit is negligible, while above 150 mm, the ground clearance of the vehicle is not high enough.

According to an embodiment, the inner side wall of each lateral spoiler and the longitudinal direction form an angle ranging from 0° to 50°, preferably from 5 to 20°, each inner side wall being angled inwards. More generally, said angle ranges from a minimum to a maximum value, with the minimum value being 0°, preferably 5°, more preferably 10°, and the maximum value being 50°, preferably 45°, and lnure preferably 20°. This makes it possible to direct air so that it does not hit the wheels.

The lateral spoiler height—along the vertical direction—can range from 30 to 250 mm. Below 30 mm, aerodynamics benefit is negligible, while above 250 mm, the ground clearance of the vehicle is not high enough. The height of the lateral spoiler may increase front the front part to the rear part of the spoiler.

According to an embodiment, the outer side wall of each lateral spoiler has a front portion the height of which increases from front to rear, and a rear portion having a substantially constant height.

According to a second aspect, the invention further relates to a vehicle with an arrangement of the spoilers, wherein the invention provides a kind of aerodynamic shield which, viewed in a horizontal plane, has a shape substantially corresponding to the vehicle shape. This aerodynamic shield (i) deflects part of the incoming air outwardly along the lateral spoilers and (ii) only allows the incoming air to flow under the vehicle through the dedicated channels, which enables an efficient control on the air flow direction.

According to an embodiment, the outer side wall of each lateral spoiler extends rearwards substantially up to the corresponding first wheel. Owing to this feature, there is no gap, or no significant gap, between the lateral spoiler and the corresponding first wheel, which prevents laterally directed air from hitting the opposite first wheel, and greatly improves the vehicle aerodynamics.

The plane of the upper edges of the front walls of the central spoiler and lateral spoilers can be located rearwards from the vehicle front face, at a longitudinal distance ranging from 0 to 30% of the longitudinal distance between the vehicle front face and the first axle, preferably from 0 to 15%. Owing to this feature, the invention makes it possible to canalize the incoming air flow substantially from the vehicle front face, thereby improving the aerodynamics. In practice, the longitudinal distance between the plane of the upper edges of the spoilers front walls and the vehicle front face can be around 5-10 cm.

According to an embodiment, the spoilers are fastened onto the front underrun protection (FUP). Other implementations can however be envisaged.

According to an embodiment, the channel width, at the channel front end, ranges from 0.06 L to 0.24 L, where L is the vehicle width, preferably from 0.08 L to 0.18 L. Below the width minimum value, it is difficult to make air enter she channels. Above the maximum value, the air flow at the channel rear end is too wide and not strong enough: as a result, the air flow cannot be efficiently canalized and adequately directed away from the wheels. In concrete terms, for a truck having a width of 2.5 m, the channel width, at the channel front end, can range from 150 to 600 mm, preferably from 200 to 450 mm.

According to an embodiment, the angle formed between the inner side wall of a lateral spoiler and a functional line ranges from 0° to 45°, preferably from 5° to 15°, the functional line being defined as the substantially horizontal line joining the rear edge of the inner side wall of the lateral spoiler and the point of the corresponding first wheel which is located inwards and most forward. Since, rearwards from the channel rear end, the air flow tends to get closer to the corresponding first wheel, this feature aims to ensure that the air flow does not hit said wheel. Furthermore, with this feature, the front area of the aerodynamic device is not too high, which would result in a less important gain from the aerodynamics point of view.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The invention relates to an aerodynamic device 1 which is designed to be fastened under a vehicle 2, in order to reduce the vehicle drag. The invention is specifically, though not exclusively, advantageous for vehicles having a substantially vertical front face, such as a truck having a trailer, typically a long-haul truck, or a bus. Although the invention will be described with respect to a track, the invention is not restricted to this particular vehicle, but may also be used in other vehicles.

Figure 1:
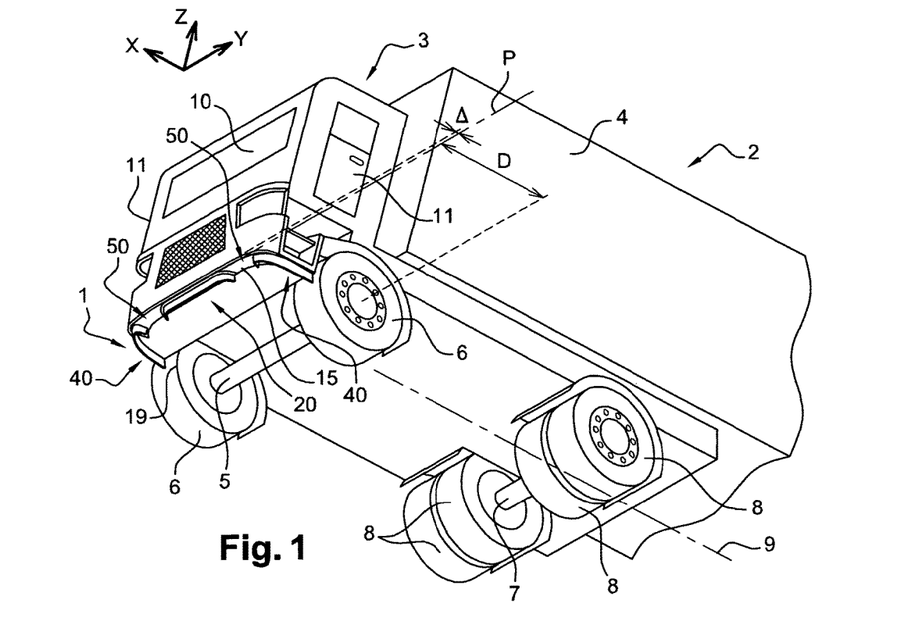
FIG. 1 is a perspective view of a vehicle equipped with an aerodynamic device according to an embodiment of the invention.

Such a vehicle is illustrated in FIG. 1. In the illustrated embodiment, the vehicle 2 comprises a cab 3 and a cargo body 4. The vehicle 2 further comprises a first axle 5 joining two first wheels 6 and a second axle 7 joining at least two second wheels 8 (here two wheels are arranged at each end of the second axle 7).

As shown in FIG. 1, the vehicle 2 has a longitudinal axis 9 along a longitudinal direction X. A transverse direction Y is defined as the direction of the axles 5, 7. Moreover, direction Z is the vertical direction—when the vehicle 2 is on a horizontal surface. The invention will be described when the vehicle 2 is on a horizontal surface.

The terms "front", "rear" and "longitudinal" refer to the longitudinal direction X. The terms "transverse", "lateral" "side", "width", "inner" and "outer" refer to the longitudinal transverse direction Y, with "inner" referring to an element located closest from the vehicle longitudinal axis 9 than an "outer" element. The terms "upper", "lower" and "height" refer to the vertical direction Z.

The operative position is defined as the position in which the aerodynamic device 1 is fastened under the vehicle 2.

The vehicle cab 3 comprises a front face 10 which is substantially vertical, and two side faces 11 which are substantially parallel to (X,Z).

The aerodynamic device 1 is fastened under the vehicle 2, near the vehicle front face 10, and extends downwards from the vehicle 2. Basically, the aerodynamic device 1 comprises one central spoiler 20 and two lateral spoilers 40.

As shown in FIGS. 3 to 7, the central spoiler 20 has a front wall 21 and two side walls 22 extending rearwards from the front wall side ends. The connection part between the front wall 21 and each side wall 22 can be curved to improve aerodynamics. The central spoiler 20 has an upper edge 24 and a lower edge 25.

Besides, the central spoiler 20 can include an upper flange 26 for fastening the central spoiler 20 to the vehicle 2. In the illustrated embodiment, the upper flange 26 extends substantially horizontally outwards from the central spoiler upper edge 24. The upper flange 26 can include holes 27 for receiving fastening means such as bolts.

The central spoiler 20 can further include reinforcing members to strengthen its structure, in particular stiffeners 28 designed to reduce the spoiler deformation under aerodynamic pressures.

Figures 4, 5, 9:
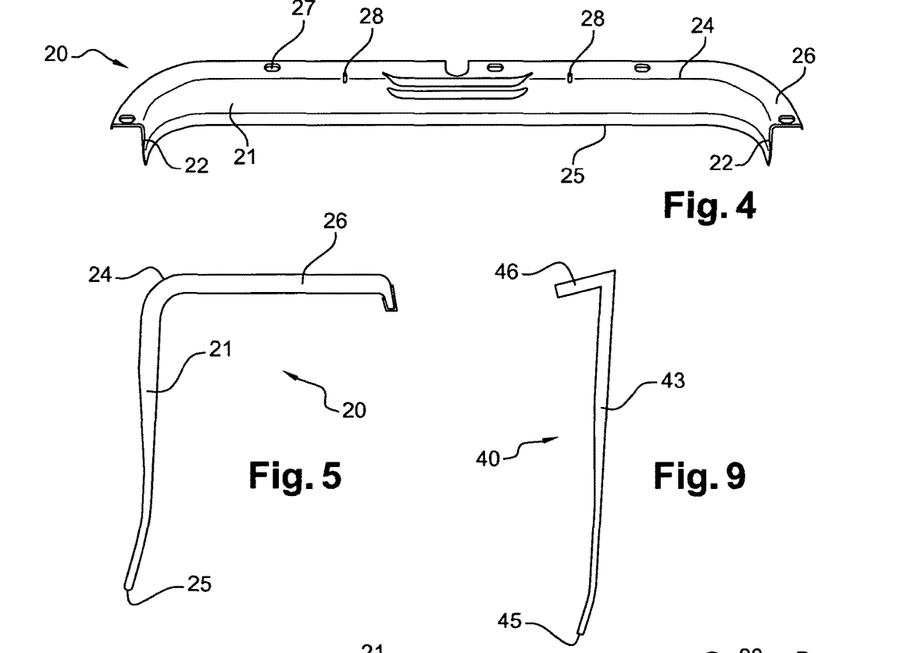
FIG. 9 shows the lateral spoiler in cross section in a vertical transverse plane.
Figure 8:
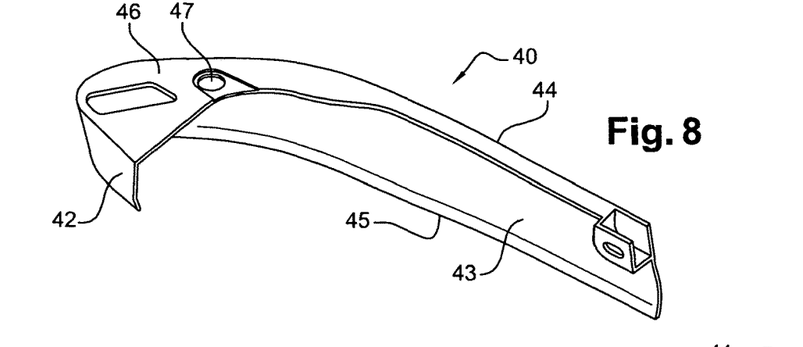
FIG. 8 is a perspective view of a lateral spoiler pertaining to the aerodynamic device.

As regards the lateral spoilers 40, they are preferably substantially identical. As shown in FIGS. 8 to 9, the lateral spoiler 40 has a front wall 41 as well as an inner side wall 42 and an outer side wall 43 each extending rearwards from a front wall side end. The connection part between the front wall 41 and each side wall 42, 43 can be curved to improve aerodynamics. The lateral spoiler 40 has an upper edge 44 and a lower edge 45.

The lateral spoiler 40 can include an upper flange 46 for fastening the lateral spoiler 40 to the vehicle 2. In the illustrated embodiment, the upper flange 46 extends substantially horizontally from the lateral spoiler upper edge 44, between the side walls 42, 43 and the front wall 41. The upper flange 46 can include holes 47 for receiving fastening means such as bolts. The lateral spoiler 40 can further include reinforcing members to strengthen its structure.

In an embodiment, as shown in FIGS. 5 and 9, the thickness of the spoilers 20, 40 decreases from the upper edge 24, 44 towards the lower edge 25, 45. For example, the thickness of the tapper flange 26, 46 of the spoilers 20, 40 can be around 4.5-5 mm, while the thickness of the lower end parts of the spoilers 20, 40 can be around 2 mm.

The front wall (21) of the central spoiler (20) may be aligned with the front wall (41) of each lateral spoiler (40). However, other relative positions between the central spoiler (20) and the two lateral spoilers (40) may be envisaged. The lateral spoilers (40) may be for instance positioned slightly rearward with respect to the central spoiler (20). On the contrary, the central spoiler may be placed slightly rearward with respect to the lateral spoilers.

The lower parts of the spoilers 20, 40 can be capable of being elastically deformed by a rigid element such as an obstacle or a pavement, so as to prevent the spoilers from being damaged in case the vehicle hits a rigid element. This can be achieved by geometrical features of the spoilers—such as the varying thickness as previously explained—and/or by the material of which the spoilers 20, 40 are made. For example, the spoilers 20, 40, or at least their lower parts, are made of a soft plastic material. Such material may be for instance a thermoplastic, a polymer like polypropylene, it can be a rubber. The spoilers may also comprise more than one material.

In the operative position of the aerodynamic device 1, i.e. when the aerodynamic device 1 is fastened under the vehicle 2, the upper edges 24, 44 of the front walls 21, 41 of the central spoiler 20 and lateral spoilers 40 are arranged substantially in a same transverse and vertical plane P. This plane P is located near the vehicle front face 10, generally rearwards from the vehicle front face 10. For example, as shown in FIG. 1, the longitudinal distance Δ between the vehicle front face 10 and plane P ranges from 0 to 30% of the longitudinal distance D between the vehicle front face 10 and the first axle 5, preferably from 0 to 15%.

Figure 2:
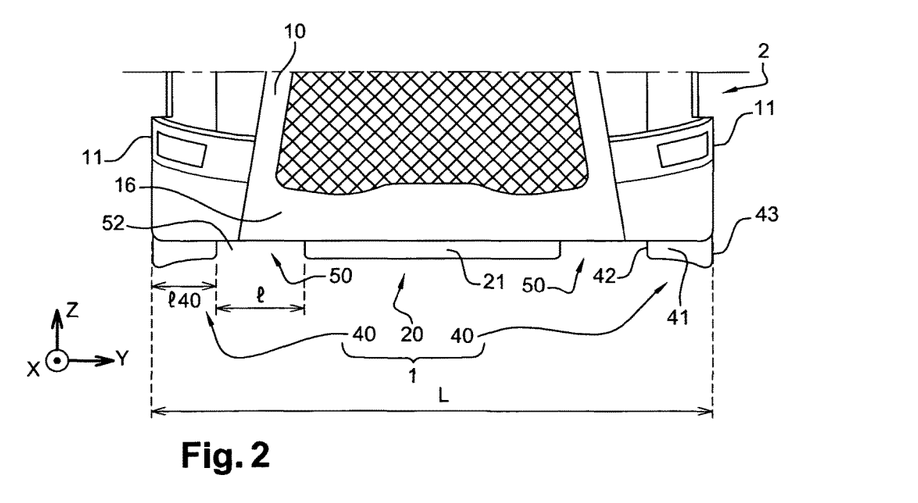
FIG. 2 is a partial front side view of the vehicle of FIG. 1.
Figure 3:
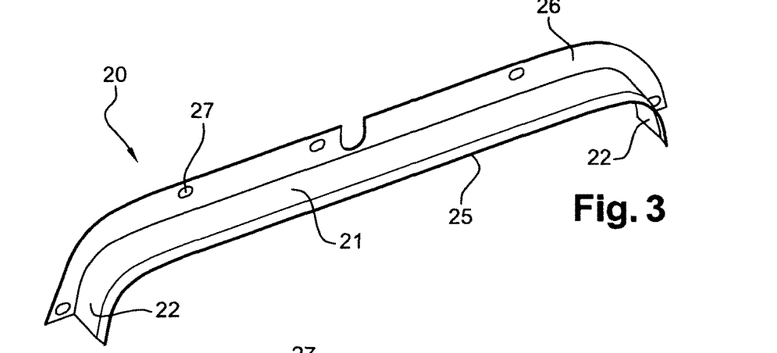
FIGS. 3, 4, 5 and 6 show the central spoiler pertaining to the aerodynamic device, respectively in perspective from the front, in perspective from the rear, in cross section in a vertical transverse plane, and in cross section in a horizontal plane.
Figure 12A:
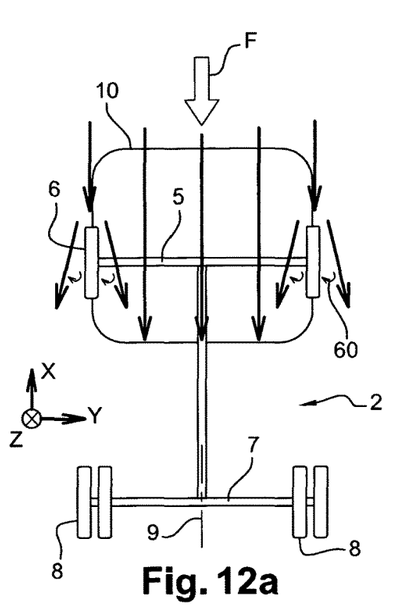
FIGS. 12a and 12b schematically represent the air flow under and around a vehicle when the incoming air flow is substantially longitudinal, respectively when the vehicle does not comprise the aerodynamic device according to the invention, and when the vehicle comprises the aerodynamic device according to the invention.
Figure 12B:
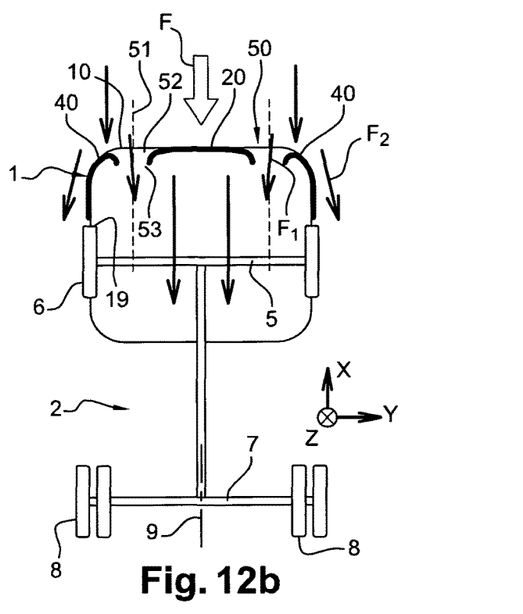

Moreover, in the operative position of the aerodynamic device 1, the outer side wall 43 of each lateral spoiler 40 is substantially flush with the corresponding vehicle side face 1, as can be seen in FIG. 2. Preferably, the outer side wall 43 of each lateral spoiler 40 extends rearwards substantially up to the corresponding first wheel 6, as can be seen in FIGS. 2 and 12b.

In an embodiment, the spoilers 20, 40 are fastened onto the front underrun protection 15—or FUP—of the vehicle 2. Alternatively, the spoilers could be fastened on other components of the vehicle, such as the front bumper 16.

In the operative position of the aerodynamic device 1, the inner side wall 42 of each lateral spoiler 40 substantially faces a corresponding side wall 22 of the central spoiler 30, at a certain distance. Said inner side wall 42 and side wall 22 thus form a channel 50 designed to canalize and accelerate air flowing under the vehicle 2, in order to improve aerodynamics, as will be explained later.

It has been found that some geometrical parameters of the spoilers have an impact on the air canalization effectiveness, therefore on the aerodynamics improvement and ultimately on the vehicle consumption.

Figure 6:
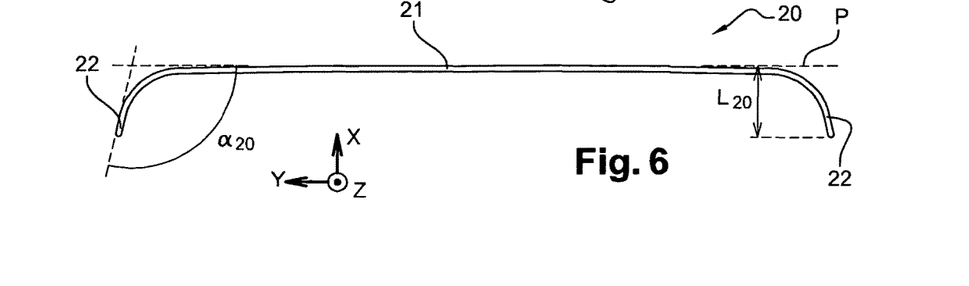

As shown in FIG. 6, the central spoiler length L20—along the longitudinal direction—from its front end towards its rear end, can range from 50 to 200 mm, preferably from 50 to 160 mm. Below the minimum value, air flow cannot be properly directed, and the aerodynamic device efficiency is not optimum. Above the maximum value, the central spoiler drag is too high; moreover, in case of lateral wind, the surface area hit by incoming air is too high, which decreases the aerodynamic device efficiency.

Besides, each side wall 22 and the front wall 21 of the central spoiler 20 can form an angle a20 ranging from 80° to 150°, preferably from 90° to 120°, for example around 110°. This feature makes it possible to direct airflow in an appropriate direction under the vehicle 2 and to optimize the aerodynamics benefit.

As regards the central spoiler height H20—along the vertical direction Z—it can range from 30 to 150 mm. This ensures a sufficient ground clearance.

Figure 7:
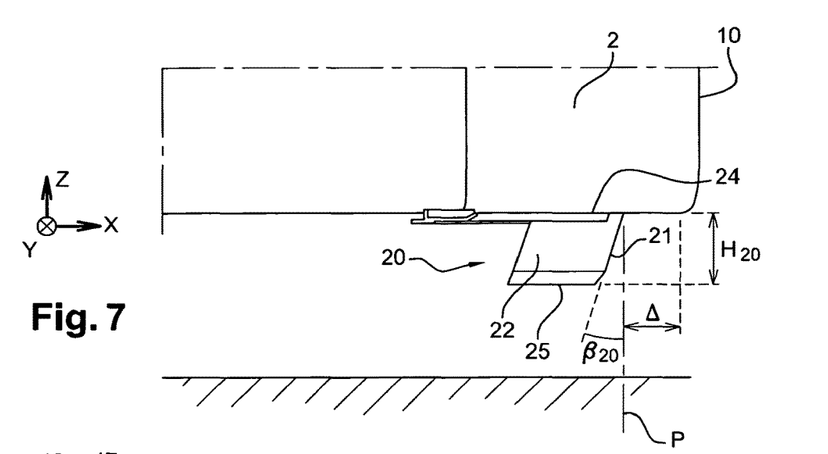
FIG. 7 is a detailed side view of the vehicle showing the central spoiler, the lateral spoiler not being illustrated.

As shown in FIG. 7, the front wall 21 of the central spoiler 20 can form with a transverse vertical plane an angle β20 ranging from 0° to 30°, preferably from 10° to 25°, the front wall 21 being oriented rearwards from the upper edge 24 towards the lower edge 25.

Figure 10:
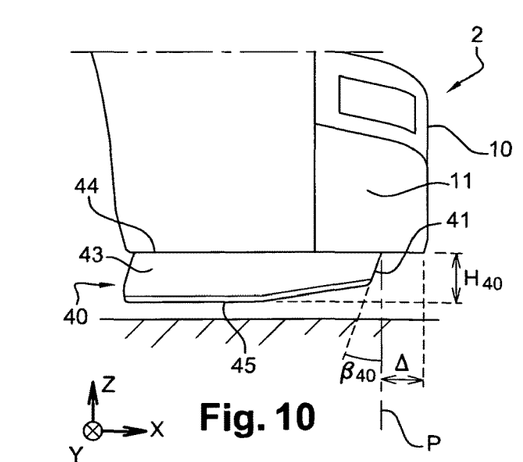
FIG. 10 is a derailed side view of the vehicle showing the lateral spoiler.

As shown in FIG. 10, the lateral spoiler height H40—along the vertical direction Z—can range from 30 to 250 mm. More specifically, in the embodiment illustrated in FIG. 10, the outer side wall 43 of each lateral spoiler 40 has a front portion the height of which increases from front to rear, and a rear portion having a substantially constant height. This allows optimizing aerodynamics while ensuring a sufficient ground clearance.

Besides, the from wall 41 of the lateral spoilers 40 can form with a transverse vertical plane an angle β40 ranging from 0° to 30°, preferably from 10° to 25°, the front wall 41 being oriented rearwards from the upper edge 44 towards the lower edge 45.

As shown in FIG. 1, the length L42 of the inner side wall 42 of the lateral spoiler—along the longitudinal direction—from its front end towards its rear end, can range from 50 to 200 mm, preferably from 50 to 160 mm. L42 can be substantially identical to L20.

Figure 11:
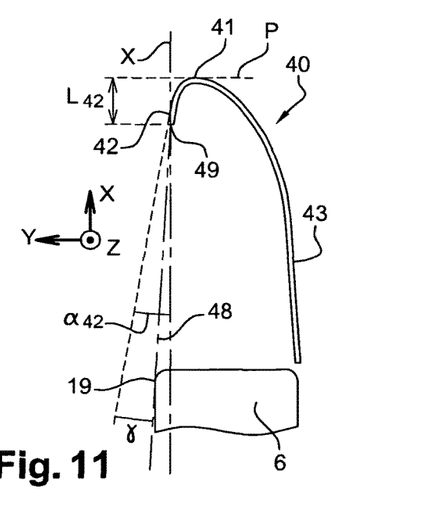
FIG. 11 is a schematic partial representation of the vehicle, in a horizontal plane, showing one lateral spoiler and one wheel.

One parameter making it possible to improve aerodynamics is the orientation of the inner side wall 42 of the lateral spoilers 40. As shown in FIG. 11, there is defined a functional line 48 as the substantially horizontal line joining the rear edge 49 of the inner side wall 42 of the lateral spoiler and the point 19 of the corresponding first wheel 6 which is located inwards and most forward. In an embodiment, the angle γ formed between the inner side wall 42 of a lateral spoiler 40 and the corresponding functional line 48 ranges from 0 to 45°, preferably from 5° to 15. With such an arrangement, the invention ensures that the air flow coming out of the channel 50 does not hit the first wheel 6. Moreover, above the maximum value of γ, the front area of the aerodynamic device 1 is too high, which can decrease aerodynamics benefits by 50% as compared to the optimum benefit which can be achieved by means of the invention.

In other words, the inner side wall 42 of the lateral spoiler 40 and the longitudinal direction X can form an angle a42 ranging from 0° to 50°, preferably from 5° to 20°, the inner side wall 42 being angled inwards.

Each of the two channels 50 formed by the aerodynamic device 1 according to the invention has a substantially longitudinal axis 51. Moreover, the channel width—along the transverse direction Y—decreases from the channel front end 52 to the channel rear end 53.

According to an embodiment, the channel width I, at the channel front end 52, ranges from 0.06 L to 0.24 L, where L is the vehicle width, and preferably from 0.08 L to 0.18 L, as can be seen in FIG. 2. When the vehicle 2 is a truck having a width L of 2.5 m, the channel width I, at the channel front end, can range from 150 to 600 mm, preferably from 5 200 to 450 mm. In other words, the channel width I, at the channel front end 52, can range from 80% to 170% of the lateral spoiler, greatest width 140, preferably from 100% to 150% (see FIG. 2).

In practice, the channel side walls—i.e, the central spoiler side wall 22 and the lateral 0 spoiler it aver side wall 42—can form an angle which points rearwards and which ranges from 5° to 50°, preferably from 10° to 40°, for example around 30°.

Owing to the aerodynamic device 1 according to the invention, and as can be seen in FIGS. 12a-13b, the incoming air flow F directed roughly rearwards the vehicle 1 is deflected and canalized by the aerodynamic device 1 away from the first and second wheels 6, 8.

More precisely, under the vehicle floor, part of the incoming air enters the channels 50, where it is canalized and accelerated. When air flows out of the channels 50, it has been 0 canalized to be directed substantially longitudinally, at least at the channel rear end 53. Air then flows rearwards under the vehicle 2 without being canalized, but due to its fairly high speed and orientation at the channel rear end 53, said air flow tends to keep substantially longitudinal. As a result, the air flow F1 that has passed through the channels 50 avoids the first wheels 6 and the second wheels 8.

Besides, another part of the incoming air under the vehicle floor flows along the outer side wall 43 of the lateral spoilers 40 which preferably extends up to the first wheels 6, leaving substantially no gap for air to pass under the vehicle 2. This air flow F2 is therefore deflected outwards from the first wheels 6, and also from the second wheels 8.

FIG. 12b schematically represents the air paths under and around the vehicle 2 equipped with an aerodynamic device 1 according to the invention, when the incoming air flow F is substantially longitudinal. As can be seen, as compared to FIG. 12a in which the vehicle 2 does not include such an aerodynamic device, the air flows F1, F2 downwards from the vehicle front face 10 avoid the first wheels 6 and the second wheels 8, which prevents or greatly limits the generation of eddies 60. This results in an improvement in aerodynamics, thereby reducing the vehicle fuel consumption. It has been determined that, with the aerodynamic device according to the invention, with a longitudinal incoming air flow, the drag is reduced by from around 1% to around 3%.

Figure 13A:
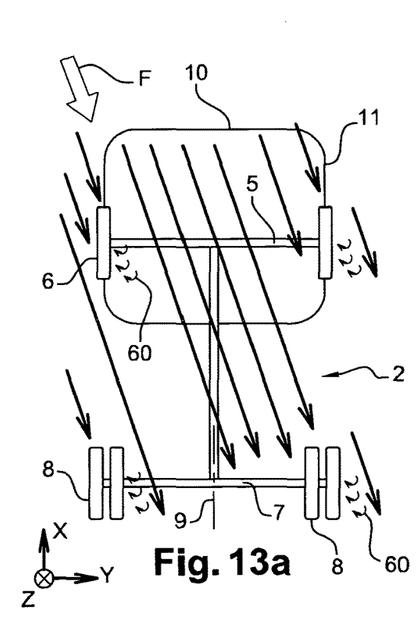
FIGS. 13a and 13b schematically represent the air flow under and around a vehicle when the incoming air flow direction is angled with respect to the longitudinal direction, respectively when the vehicle does not comprise the aerodynamic device according to the invention, and when the vehicle comprises the aerodynamic device according to the invention.
Figure 13B:
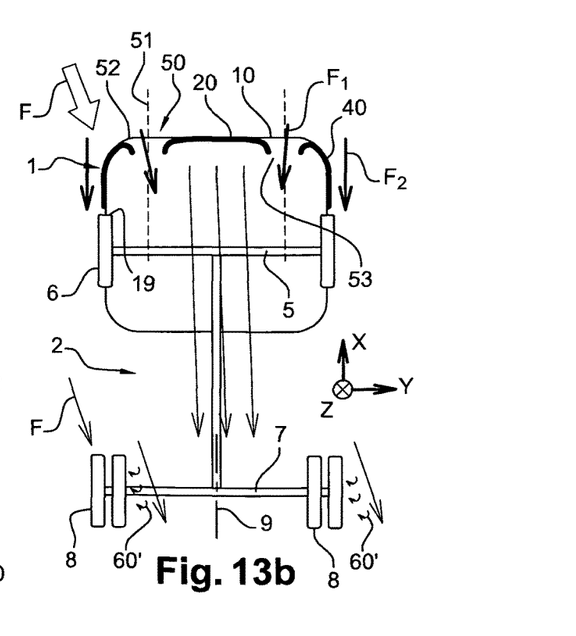

FIG. 13b schematically represents the air paths wider and around the vehicle 2 equipped with an aerodynamic device 1 according to the invention, when the incoming air flow F is angled with respect to the longitudinal direction X. As can be seen, as compared to FIG. 13a in which the vehicle 2 does not include such an aerodynamic device, the air flows F1, F2 downwards from the vehicle front face 10 is redirected in order to avoid the first wheels 6 and the second wheels 8. Some air flow may however hit the second wheels 8, but said air flow is due to the lateral wind directed towards said second wheels 8, and does not include the air flow F1 that has passed between the front wheels 6. Thus, there may remain eddies 60' generated by the incoming air, but these eddies 60' are much less significant than the eddies 60 generated around the wheels 6, 8 in a vehicle which does not include such an aerodynamic device, as shown in FIG. 13a.

As a consequence, the invention also makes it possible to greatly improve aerodynamics in case of lateral wind. The aerodynamic device efficiency is even increased in case of lateral wind combined to front incoming air flow. It has been determined that, with the aerodynamic device according to the invention, with an incoming air flow which is not oriented longitudinally, the drag is reduced by from around 3% to around 5%.

Computer simulations have shown that, with the aerodynamic device according to the invention, on average, the vehicle drag can be reduced by from around 1% to 5%, and in general around 3%.

Computer simulations have also shown that the aerodynamic device 1 according to the invention is particularly effective for vehicle speeds above 50 km/h, in terms of fuel consumption decrease.

It is to be understood that the present invention is not limited to the embodiments described a hove and illustrated in the drawings; rather, the skilled person will recognize that many changes and modifications may be made within the scope of the appended claims.

The invention claimed is:

1. An aerodynamic device suitable to be fastened under and to extend downwards from a vehicle having a longitudinal axis, a front face and two side faces, near the vehicle front face, the aerodynamic device comprising:
   one central spoiler having a front wall and two side walls extending rearwards from side ends of the front wall of the central spoiler; and
   two lateral spoilers, each lateral spoiler having a front wall as well as an outer side wall and an inner side wall each extending over entire lengths thereof rearwards from side ends of the front wall of the lateral spoiler;
   wherein, in an operative position of the aerodynamic device, the inner side wall of each lateral spoiler substantially faces a corresponding side wall of the central spoiler and forms a channel having a substantially longitudinal axis and having a width along a transverse direction of the channel which decreases from a front end of the channel to a rear end of the channel, so that the channel is capable of canalizing and accelerating air flowing under the vehicle substantially longitudinally from the channel front end towards the rear end of the channel.

2. The aerodynamic device according to claim 1, wherein the channel side walls form an angle which points rearwards and which ranges from 5° to 50° to a longitudinal direction of the vehicle.

3. The aerodynamic device according to claim 1, wherein the width of the channel, at the channel front end, ranges from 80% to 170% of a greatest width of the lateral spoiler.

4. The aerodynamic device according to claim 1, wherein lower parts of the central spoiler and the lateral spoilers are capable of being elastically deformed by a rigid element such as an obstacle or a pavement.

5. The aerodynamic device according to claim 1, wherein a thickness of at least one spoiler of the central spoiler and the lateral spoilers decreases from an upper edge towards a lower edge of the spoiler.

6. The aerodynamic device according to claim 1, wherein each side wall of the central spoiler and the front wall of the central spoiler form an angle ranging from 80° to 150°.

7. The aerodynamic device according to claim 1, wherein a length of the central spoiler along a longitudinal direction of the central spoiler from a front end towards a rear end of the central spoiler ranges from 50 to 200 mm.

8. The aerodynamic device according to claim 1, wherein a height of the central spoiler along a vertical direction of the central spoiler ranges from 30 to 150 mm.

9. The aerodynamic device according to claim 1, wherein the inner side wall of each lateral spoiler and a longitudinal direction of the vehicle form an angle ranging from 0° to 50°, each inner side wall being angled inwards.

10. The aerodynamic device according to claim 1, wherein a height of the lateral spoilers along a vertical direction of the lateral spoilers ranges from 30 to 250 mm.

11. The aerodynamic device according to claim 1, wherein the outer side wall of each lateral spoiler has a front portion, a height of which front portions increases from front to rear, and a rear portion having a substantially constant height.

12. A vehicle having a longitudinal axis, a front face and two side faces, the vehicle comprising
   a first axle joining two first wheels and a second axle joining two second wheels, and
   an aerodynamic device according to claim 1, the aerodynamic device being fastened under and extending downwards from the vehicle, such that:
      the outer side wall of each lateral spoiler is substantially flush with a corresponding vehicle side face; and
      air flowing rearwards under and around the vehicle is deflected and canalized by the aerodynamic device away from the first and second wheels.

13. The vehicle according to claim 12, wherein the outer side wall of each lateral spoiler extends rearwards substantially up to the corresponding first wheel.

14. The vehicle according to claim 12, wherein a plane of upper edges of the front walls of the central spoiler and lateral spoilers is located rearwards from the vehicle front face, at a longitudinal distance ranging from 0 to 30% of the longitudinal distance between the vehicle front face and the first axle.

15. The vehicle according to claim 12, wherein the central spoiler and the lateral spoilers are fastened onto a front underrun protection of the vehicle.

16. The vehicle according to claim 12, wherein a width of the channel at the channel front end ranges from 0.6 L to 0.24 L, where L is a width the vehicle.

17. The vehicle according to claim 12, wherein the angle formed between the inner side wall of a lateral spoiler and a functional line ranges from 0° to 45°, the functional line being defined as a substantially horizontal line joining a rear edge of the inner side wall of the lateral spoiler and a point of a corresponding first wheel which is located inwards and most forward.

* * * * *